United States Patent [19]

Gruber

[11] Patent Number: 4,465,718
[45] Date of Patent: Aug. 14, 1984

[54] POLY (METH)ACRYLATE COMPOUNDS AND THEIR USE IN ANAEROBIC ADHESIVES AND SEALANTS

[75] Inventor: Werner Gruber, Korschenbroich, Fed. Rep. of Germany

[73] Assignee: Henkel Kommanditgesellschaft auf Aktien, Duesseldorf, Fed. Rep. of Germany

[21] Appl. No.: 556,033

[22] Filed: Nov. 29, 1983

[30] Foreign Application Priority Data

Dec. 9, 1982 [DE] Fed. Rep. of Germany ....... 3245563

[51] Int. Cl.³ .............................................. C08G 18/38
[52] U.S. Cl. ..................... 528/49; 252/182; 524/300; 526/301; 560/33; 560/166
[58] Field of Search ..................... 528/49; 560/33, 166; 252/182; 524/300; 526/301

[56] References Cited
U.S. PATENT DOCUMENTS 2,830,038  4/1958  Pattison .................................. 528/49
3,484,413 12/1969  Kaufman ................................ 528/49
3,629,187 12/1971  Waller .................................. 523/115
3,814,578  6/1974  Pittman et al. ........................ 528/49

Primary Examiner—Maurice J. Welsh
Attorney, Agent, or Firm—Ernest G. Szoke; Nelson Littell, Jr.

[57] ABSTRACT

This invention is directed to compounds of the formula

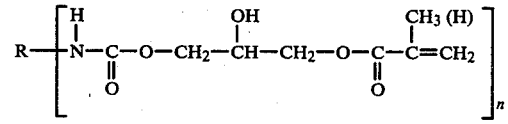

wherein R is a radical derived from an organic diisocyanate or triisocyanate and n is 2 or 3, and the preparation thereof. The compounds are especially useful in anaerobic adhesives and sealants.

7 Claims, No Drawings

POLY (METH)ACRYLATE COMPOUNDS AND THEIR USE IN ANAEROBIC ADHESIVES AND SEALANTS

FIELD OF THE INVENTION

This invention relates to novel anaerobic adhesives and sealing compounds based on novel urethane compounds containing (meth)acrylate groups. This invention also relates to a process for the production of compounds containing the urethane groups and terminal (meth)acrylate groups.

BACKGROUND OF THE INVENTION

Compounds containing more than one acrylate or (meth)acrylate group in the molecule have long been known and are used in particular as adhesives and sealing compounds that harden under anaerobic conditions. In many cases, compounds containing at least two (meth)acrylate groups in the molecule are used for these applications. By varying the basic molecule, it is possible to influence certain desired properties of these anaerobic compositions. In addition to a short hardening time, more particularly, a relatively short time before an initial strength is reached, high strengths under thermal load are particularly desirable.

Reaction products of polyfunctional aromatic and aliphatic isocyanates and hydroxyalkyl methacrylates have been known for some time (cf., U.S. Pat. No. 3,425,988). These reaction products may be processed with the usual auxiliary components to form anaerobic sealing compounds and adhesives. They generally show high flexibility and also elasticity. Unfortunately, the strengths obtainable, which are still satisfactory at room temperature or moderately elevated temperatures, are far from satisfactory under relatively intense thermal load.

OBJECTS OF THE INVENTION

It is an object of the invention to provide novel poly(meth)acrylate compounds.

It is also an object of the invention to provide a process for preparing said poly(meth)acrylate compounds.

It is a further object of the invention to provide anaerobic adhesives and sealants containing said poly(meth)acrylate compounds and having high thermal stability.

These and other objects of the invention will become more apparent in the discussion below.

DETAILED DESCRIPTION OF THE INVENTION

The invention herein relates first and foremost to the preparation of compounds containing urethane groups and terminal (meth)acrylate groups. These compounds are prepared by reacting compounds which contain more than one isocyanate group in the molecule and of which the molecular weight does not exceed 2500 with 2,3-epoxy-1-propanol (glycidol) in such a ratio that epoxy groups replace all the isocyanate groups and are subsequently reacted with the equivalent quantity of methacrylic acid and/or acrylic acid.

In one favorable embodiment, the isocyanates may be selected from a group of compounds not exceeding a molecular weight of 700, namely, tolyene diisocyanate, dimerized tolyene diisocyanate, diphenylmethane diisocyanate, naphthylene diisocyanate, hexamethylene diisocyanate, isophorone diisocyanate, trimethyl hexamethylene diisocyanate, triphenylmethane diisocyanate, dianisidine diisocyanate, tris-(4-isocyanatophenyl)-thiophosphate, and also the adduct of 3 moles of tolylene diisocyanate with trimethylol propane. In another favorable embodiment, it is possible to use compounds containing more than one isocyanate group in the molecule which are reaction products of hydroxyl-terminated polyesters having a molecular weight of from about 500 to 2000 with low molecular weight diisocyanates or triisocyanates. The molecular weights were determined by measurement of the osmotic pressure.

The hydroxyl-terminated polyesters are known compounds which may be obtained by esterification from polyhydric alcohols, such as ethylene glycol, diethylene glycol, triethylene glycol, trimethylol propane, butane diol, hexane diol, and polybasic acids or their anhydrides, for example, maleic acid anhydride, phthalic acid anhydride, or even terephthalic acid and adipic acid. Polyesters such as these should have OH numbers of from about 80 to 250. These hydroxyl-terminated polyesters are then reacted in known manner with low molecular weight diisocyanates or triisocyanates. In this regard, it has proven to be particularly suitable to use tolylene diisocyanate, more particularly the commercially available monomer mixture, and also diphenylmethane diisocyanate or even naphthylene diisocyanate. The reaction may optionally be carried out in the presence of solvents and may be accelerated by suitable catalysts based upon organo-tin compounds or by tertiary amines.

Both the relatively low molecular weight, polyfunctional isocyanates mentioned in the first group and also those mentioned in the second group are then reacted in a first process step with 2,3-epoxy-1-propanol, which is referred to hereinafter as glycidol. The reaction of the glycidol with the isocyanates is best carried out in anhydrous organic solvents, such as toluene, xylene, hydrocarbons, or even esters, and in the presence of suitable catalysts, such as tertiary amines or quaternary ammonium bases which may be used, for example, in the form of ion exchangers. For the reaction, the ratio between glycidol and isocyanate should be calculated or determined in such a way that there is one isocyanate group for every OH-group in the glycidol.

The compounds thus obtained are frequently crystallizable compounds, particularly where the isocyanates used belong to the first group. This applies in particular when the radical R in the reaction equation

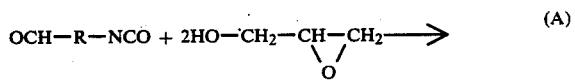

(A)

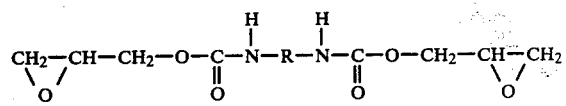

is an alkyl aromatic hydrocarbon radical, i.e., alkylaryl, having from 7 to 19 carbon atoms.

The compounds thus obtained are then reacted with acrylic acid or, preferably, with methacrylic acid. Shown in simplified form on one side of the molecule, this reaction precedes in accordance with following equation:

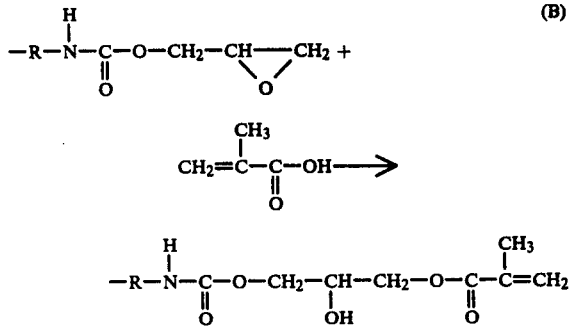

(B)

In this case, therefore, there should be one epoxide group for every carboxyl group.

The present invention also relates to novel (meth)acrylates corresponding to the formula

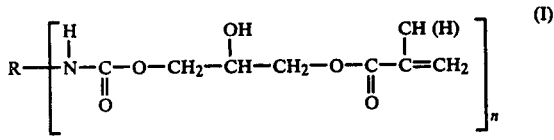

(I)

wherein R is a radical derived from an organic diisocyanate or triisocyanate and n is 2 or 3. With regard to these novel poly(meth)acrylates, those in which R represents an alkyl aromatic hydrocarbon radical containing from 7 to 19 carbon atoms are preferred.

The novel urethane poly(meth)acrylate compounds are distinguished from those known from DE-AS No. 17 45 063 by the presence of a secondary hydroxyl group which has entered the molecule through the glycidyl radical. It must be regarded as surprising that, in the production of anaerobic adhesives and sealing compounds, this minimal structural difference brings about a surprisingly marked improvement in the thermal stability of the bonds and seals.

Accordingly, the present invention also relates to anaerobic adhesives and sealing compounds containing the compounds of Formula I as their essential ingredient. In general, these compounds are present with other copolymerizable compounds in an amount of from about 20 to 80% by weight, based upon all the total weight of all the polymerizable compounds present.

Both monomethacrylates and also bis-methacrylates may be used as additional polymerizable compounds in the anaerobic compositions. Suitable esters are derived, for example, from the following alcohols: tetrahydrofurfuryl alcohol, dimethylol tetrahydrofuran, cyclohexanol, ethylhexanol, ethylene glycol, and propylene glycol. The bis-methacrylates of ethylene glycol, triethylene glycol, tetraethylene glycol, and pentaethylene glycol and the monomethacrylates of ethylene glycol are preferred mixing components. It may also be advisable to use free polymerizable carboxylic acids, such as methacrylic acid or acrylic acid, in small quantities.

The initiators used for the novel adhesives and sealing compounds are, in particular, hydroperoxides, such as cumene hydroperoxide or tert.-butyl hydroperoxide. They are generally used in a quantity of from about 0.5 to 5% by weight, based upon the total weight of the polymerizable components present.

It is also advisable to use stabilizers and accelerators. A suitable stabilizer is quinone or hydroquinone used in a concentration of from 100 to 1000 ppm, preferably in a concentration of 200 to 500 ppm, based upon the total weight of polymerizable components present. Suitable accelerators are so-called imide accelerators, such as benzoic acid sulfimide, or even sulfohydrazide accelerators, such as p-toluenesulfonic acid hydrazide, preferably in combination with a tertiary amine, such as, for example, N,N-dimethyl-p-toluidine. Peracetic acid is a suitable stabilizer. The accelerators and stabilizers have to be used in a suitable ratio to obtain optimal properties of the adhesives and sealing compounds. They are generally used in quantities of from about 0.1 to 3% by weight, based upon the total weight of the polymerizable components present.

Thickeners or dyes may also be added for certain applications. The adhesives or sealing compounds are prepared by mixing all the components at room temperature and, in most cases, remain stable for years providing they are stored in sufficiently airtight vessels and in a cool place.

The anaerobic adhesives are particularly suitable for bonding metals in cases where high strengths at elevated temperatures are required. Accordingly, they are used for bonding surfaces and metal components of a variety of different materials, for bearing retention, for sealing pipe couplings, and the like, particularly in cases where thermal stressing is encountered.

The following examples are intended to illustrate the invention and should not be construed as limiting it thereto.

EXAMPLES

Example 1

(a) Reaction of toluene diisocyanate with glycidol

In a reaction flask, 87 gm (0.5 mol) of toluene diisocyanate (commercially available isomer mixture) and 74 gm (1 mol) of glycidol were dissolved in 500 ml of anhydrous toluene, followed by stirring for five hours at 60° C. After the solvent was distilled off, 161 gm of the corresponding glycidyl urethane were obtained.

M.p.: 75°–78° C.
MW: 322.32.
Analysis for $C_{15}H_{18}N_2O_6$:

|  | C | H | N | Epoxide |
| --- | --- | --- | --- | --- |
| Calculated: | 55.90% | 5.63% | 8.69% | 9.94% |
| Found: | 55.42% | 5.75% | 8.90% | 9.7% |

(b) Reaction of the glycidyl urethane based upon toluene diisocyanate with methacrylic acid One hundred twenty-one grams (0.376 mol) of glycidyl urethane were dissolved in 300 ml of acetone, and the resulting solution was reacted at 65° C. with 61.9 gm (0.72 mol) of methacrylic acid in the presence of 0.1% by weight of hydroquinone and 0.3% by weight of triethylamine. After a reaction time of ten hours, the acid number was <10, and the reaction was terminated. The solvent was distilled off, 176 gm of a viscous oil being left behind. The epoxide content amounted to 0.3% by weight, corresponding to a conversion of 96%.

Example 2

(a) Reaction of diphenylmethane diisocyanate with glycidol

One hundred twenty-five grams (0.5 mol) of diphenylmethane diisocyanate and 74 gm (0.5 mol) of glycidol were reacted in 500 ml of anhydrous toluene in a reaction flask. After a reaction time of five hours at 50° C., no more isocyanate could be detected. The solvent was evaporated off, 197 gm of colorless glycidyl urethane being left behind.

M.p.: 121° C.
MW: 398.42.
Analysis for $C_{21}H_{22}N_2O_6$:

|  | C | H | N | Epoxide |
|---|---|---|---|---|
| Calculated: | 63.31% | 5.57% | 7.03% | 8.04% |
| Found: | 63.55% | 5.70% | 6.80% | 7.7% |

(b) Reaction of the glycidyl urethane based upon diphenylmethane diisocyanate with methacrylic acid One hundred ninety-nine grams (0.5 mol) of glycidyl urethane were reacted at 65° C. with 86 gm (1 mol) of methacrylic acid in 300 ml of acetone in the presence of 1000 ppm of hydroquinone and 0.3% by weight of triethylamine. After a reaction time of ten hours, the acid number was <10. The solvent was distilled off, 280 gm of a viscous oil being left behind. The epoxide content amounted to 0.5% by weight, corresponding to a conversion of 92%.

Example 3

(a) Reaction of a hydroxypolyester with tolylene diisocyanate

One hundred thirty-four grams of a prepolymer of a polyester containing hydroxyl groups (based on ethylene glycol, triethylene glycol, maleic acid anhydride, and phthalic acid anhydride; OH number: 112) and tolylene diisocyanate (NCO content: 2.4%) were reacted with 29.6 gm of glycidol in 500 ml of toluene at 60° C. After a reaction time of five hours, no more isocyanate could be detected. The solvent was evaporated off, a viscous oil being left behind.

Epoxide content: Calculated: 1.15%. Found: 1.0%.

(b) Reaction of the glycidyl urethane based on a polyester with methacrylic acid One hundred sixty-five grams of glycidyl urethane corresponding to Example 3 were reacted at 70° C. with 35 gm of methacrylic acid in 300 ml of ethyl acetate in the presence of 1000 ppm of hydroquinone and 0.3% by weight of triethylamine. After a reaction time of 15 hours, the acid number was <10. The solvent was distilled off in vacuo, 195 gm of a viscous oil being left behind. The epoxide content amounted to 0.2% by weight, corresponding to a conversion of 83%.

Example 4

The following general formulation (in % by weight) was used for the preparation of anaerobic adhesives:
53.0% of bis-methacrylate corresponding to Examples 1 to 3
10.0% of hydroxyethyl methacrylate
30.0% of the bis-methacrylate of triethylene glycol
3.0% of methacrylic acid
0.01% of hydroquinone
1.0% of p-toluenesulfonic acid hydrazide
1.0% of cumene hydroperoxide, 70% in cumene
1.0% of N,N-dimethyl-p-toluidine
1.0% of peracetic acid In accordance with DIN No. 54 452, compressive shear strength was tested once after storage for 48 hours at 20° C. and then again after additional tempering at 180° C. The second measurement was made at the temperature of 180° C. The results obtained for each sample after storage for 48 hours and additional tempering are shown in the following table:

| Bis-methacrylate of Example No. | Compressive Shear Strength | |
|---|---|---|
|  | 48 hr/20° C. | 48 hr/20° C. + 3 hr/180° C. |
| 1(b) | 37 N/mm² | 30 N/mm² |
| 2(b) | 45 N/mm² | 35 N/mm² |
| 3(b) | 48 N/mm² | 24 N/mm² |

Comparison Testing

The bis-methacrylate of tolylene diisocyanate and hydroxyethyl methacrylate according to DE-AS No. 17 45 063, Example 1, was introduced into the general formulation described above. After testing for 48 hr/20° C., a value of 45 N/mm² was obtained for the compressive shear strength. After additional tempering for 3 hr/180° C., that value (as measured at 180° C.) had fallen to 15 N/mm².

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A compound of the formula

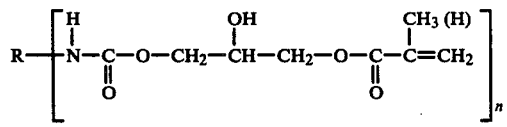

wherein R is a radical derived from an organic diisocyanate or triisocyanate and n is 2 or 3.

2. The compound of claim 1, wherein R is an aralkyl having from 7 to 19 carbon atoms.

3. A process for preparing a compound of claim 1, wherein a compound which contains more than one isocyanate group in the molecule and of which the molecular weight does not exceed 2500 is reacted with 2,3-epoxy-1-propanol in such a ratio that epoxy groups replace all the isocyanate groups and the resulting product is subsequently reacted with an equivalent quantity of methacrylic acid and/or acrylic acid.

4. The process of claim 3, wherein the compound containing more than one isocyanate group in the molecule has a molecular weight not exceeding 700 and is selected from the group consisting of tolylene diisocyanate, dimerized tolylene diisocyanate, diphenylmethane diisocyanate, naphthylene diisocyanate, hexamethylene diisocyanate, isophorone diisocyanate, trimethyl hexamethylene diisocyanate, triphenylmethane diisocyanate, dianisidine diisocyanate, tris-(4-isocyanatophenyl)-thiophosphate, and the adduct of 3 moles of tolylene diisocyanate with trimethyl propane.

5. The process of claim 3, wherein the compound containing more than one isocyanate group in the molecule is a reaction product of a hydroxyl-terminated polyester having a molecular weight of from about 500 to 2000 with a low molecular weight diisocyanate or triisocyanate.

6. An aerobic adhesive or sealant composition comprising an effective amount of at least one compound of claim 1.

7. The composition of claim 6 which contains from about 20 to 80% by weight of at least one said compound and from 20 to 80% by weight of compounds selected from the group consisting of (meth)acrylic acid and (meth)acrylic acid esters as polymerizable components.

* * * * *